(12) United States Patent
Schall et al.

(10) Patent No.: US 10,272,734 B2
(45) Date of Patent: Apr. 30, 2019

(54) AIR CONDITIONING SYSTEM

(71) Applicant: Behr GmbH & Co. KG, Stuttgart (DE)

(72) Inventors: Matthias Schall, Ostfildern-Ruit (DE); Alfons Schäfer, Altbach (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 700 days.

(21) Appl. No.: 13/930,508

(22) Filed: Jun. 28, 2013

(65) Prior Publication Data

US 2014/0011438 A1  Jan. 9, 2014

(30) Foreign Application Priority Data

Jul. 4, 2012  (DE) .................. 10 2012 211 669

(51) Int. Cl.
 *B60H 1/00* (2006.01)
(52) U.S. Cl.
 CPC ..... *B60H 1/00064* (2013.01); *B60H 1/00035* (2013.01); *B60H 2001/00092* (2013.01)
(58) Field of Classification Search
 CPC ............ B60H 1/00035; B60H 1/00064; B60H 2001/00092; B60J 7/22; B60R 9/05
 USPC ........ 454/156, 160; D23/324–328, 386, 387, D23/393
 See application file for complete search history.

(56) References Cited

U.S. PATENT DOCUMENTS

| 2,638,778 | A | * | 5/1953 | Miller | .................. | G01N 11/06 |
| | | | | | | 73/54.01 |
| 3,021,836 | A | * | 2/1962 | Marsden | ........... | A61M 16/0488 |
| | | | | | | 128/202.28 |
| 3,934,923 | A | * | 1/1976 | Lissaman | ............. | B62D 35/001 |
| | | | | | | 296/180.2 |

(Continued)

FOREIGN PATENT DOCUMENTS

| CN | 101655262 A | 2/2010 | |
| DE | 10350193 A1 * | 5/2004 | ......... B60H 1/00028 |

(Continued)

OTHER PUBLICATIONS

JP48-30939-01U English machine translation, Apr. 16, 1973.*
German Search Report, DE 10 2012 211 669.9, dated Feb. 7, 2013, 5 pgs.

*Primary Examiner* — Gregory L Huson
*Assistant Examiner* — Phillip Decker
(74) *Attorney, Agent, or Firm* — Paul D. Strain, Esq.; Strain & Strain PLLC

(57) ABSTRACT

The invention relates to an air conditioning system, in particular for use in a motor vehicle, having a first flow channel for a first airflow which may be influenced thermally, having a second flow channel for a second airflow which may be influenced thermally, wherein the first flow channel extends relative to the second flow channel at a predeterminable angle, and having an air guidance element, wherein the air guidance element is arranged on or adjacent to at least one internal wall of the first flow channel or the (Continued)

second flow channel, wherein the air guidance element in section has a substantially convex shape in the direction of the first or second flow channel and protrudes into the first or second flow channel, wherein the air guidance element has at least one finger which protrudes at a predeterminable angle into the first flow channel or the second flow channel.

17 Claims, 5 Drawing Sheets

(56) References Cited

U.S. PATENT DOCUMENTS

| | | | | |
|---|---|---|---|---|
| 4,108,376 A * | 8/1978 | Matsuda | | B60H 1/00 237/12.3 A |
| 5,014,609 A * | 5/1991 | Weck | | F24F 1/01 454/237 |
| 5,242,270 A * | 9/1993 | Partington | | F01D 5/22 416/193 A |
| 5,630,640 A * | 5/1997 | Fior | | B60J 7/22 296/91 |
| 5,775,407 A * | 7/1998 | Inoue | | B60H 1/00064 165/203 |
| 5,971,847 A * | 10/1999 | Webb | | B60H 1/3435 454/290 |
| 6,007,421 A * | 12/1999 | Schwarz | | B60H 1/00678 137/601.18 |
| 6,135,201 A * | 10/2000 | Nonoyama | | B60H 1/00064 165/202 |
| 6,347,988 B1 * | 2/2002 | Kurokawa | | B60H 1/00692 454/121 |
| 6,482,081 B2 * | 11/2002 | Vincent | | B60H 1/00064 165/42 |
| 6,568,773 B1 * | 5/2003 | Park, II | | B29C 44/3411 165/169 |
| 6,623,350 B2 * | 9/2003 | Goupil, Jr. | | B60H 3/0616 454/158 |
| 6,640,570 B2 * | 11/2003 | Nishida | | B60H 1/00064 165/42 |
| 6,652,372 B2 * | 11/2003 | Muller | | B60H 1/00671 454/156 |
| D538,922 S * | 3/2007 | Graham | | D23/386 |
| 7,259,963 B2 * | 8/2007 | Germagian | | H05K 7/20745 361/690 |
| 7,281,574 B2 * | 10/2007 | Shibata | | B60H 1/00064 165/203 |
| 7,477,514 B2 * | 1/2009 | Campbell | | H05K 7/20745 165/80.4 |
| 7,540,321 B2 * | 6/2009 | Simmet | | B60H 1/0005 165/103 |
| 7,540,322 B2 * | 6/2009 | Kang | | B60H 1/00064 165/202 |
| D634,419 S * | 3/2011 | Lambertson | | D23/393 |
| 8,091,623 B2 * | 1/2012 | Hackl | | B60H 1/00685 165/103 |
| 8,113,268 B2 * | 2/2012 | Stevenson | | B60H 1/00692 454/156 |
| 2002/0007944 A1 * | 1/2002 | Schwarz | | B60H 1/00064 165/203 |
| 2002/0084058 A1 * | 7/2002 | Ozeki | | B60H 1/0005 165/42 |
| 2007/0017655 A1 * | 1/2007 | Mouri | | B60H 1/0005 165/42 |
| 2007/0204985 A1 * | 9/2007 | Fukagawa | | B60H 1/00685 165/203 |
| 2008/0017366 A1 * | 1/2008 | Koukouravas | | B60H 1/00542 165/204 |
| 2009/0036048 A1 * | 2/2009 | Rademacher | | B60H 1/00678 454/156 |
| 2010/0043470 A1 * | 2/2010 | Kang | | B60H 1/00064 62/239 |
| 2010/0163209 A1 * | 7/2010 | Eguchi | | B60H 1/00028 165/41 |
| 2011/0005719 A1 * | 1/2011 | Seto | | B60H 1/00064 165/61 |
| 2011/0197512 A1 * | 8/2011 | Nomura | | B60H 1/00692 49/70 |
| 2013/0250718 A1 * | 9/2013 | Venezia | | B60H 1/00035 366/337 |
| 2013/0306298 A1 * | 11/2013 | Rothenhauser | | F24F 13/14 165/204 |
| 2015/0038067 A1 * | 2/2015 | Byon | | B60H 1/00021 454/160 |
| 2016/0361969 A1 * | 12/2016 | Wiesmann | | B60H 1/00064 |
| 2016/0368343 A1 * | 12/2016 | Venezia | | B60H 1/00064 |

FOREIGN PATENT DOCUMENTS

| | | | |
|---|---|---|---|
| DE | 10 2005 047 441 A1 | 4/2006 | |
| DE | 198 26 990 B4 | 1/2007 | |
| DE | 10 2010 039 674 A1 | 3/2012 | |
| EP | 1 445 133 B1 | 3/2007 | |
| FR | 2853722 A1 * | 10/2004 | ......... B60H 1/00064 |
| JP | 48-30939 U | 4/1973 | |
| JP | 57-202315 U | 12/1982 | |
| JP | 57202315 U * | 12/1982 | |
| JP | 2011224135 A * | 11/2011 | |

* cited by examiner

AIR CONDITIONING SYSTEM

CROSS-REFERENCE TO RELATED PATENT APPLICATIONS

This application is based upon and claims the benefit of priority from prior German Patent Application No. DE 10 2012 211 669.9, filed Jul. 4, 2012, the entire contents of which are incorporated herein by reference in their entirety.

TECHNICAL FIELD

The invention relates to an air conditioning system, in particular for use in a motor vehicle, having a first flow channel for cold air and a second flow channel for warm air, wherein the first flow channel extends relative to the second flow channel at a predeterminable angle, and having a first air guidance element which is arranged in one of the two flow channels.

PRIOR ART

The requirements for air conditioning systems, in particular for use in motor vehicles, are constantly increasing. In particular, whilst the constructional space remains the same or even reduces, the efficiency is intended to be continually increased.

Amongst the most important functions of an air conditioning system are the implementation and the maintaining of the air conditioning of the interior as predetermined by passenger requirements. This is generally achieved by the inflow of defined quantities of air at different temperatures. In order to ensure an optimal distribution in the interior, to this end the air brought to the required temperature by the air conditioning system is guided through a plurality of outlet openings into the interior. In this case, quantities of air at different temperatures are able to flow out of the outlets. Said desired temperature differences between the outlets are generally denoted as stratification. To this end, regions at different temperature levels are produced in the mixing chamber of the air conditioning system, from which the air is conducted to the different outlet openings of the air conditioning system, depending on passenger requirements.

In the prior art, these temperatures which are required for optimal stratification are achieved by influencing the airflow, in particular in the region of the mixing chamber in the air conditioning system, by the geometric design or by the incorporation of air guidance elements in the airflow.

Thus, for example, EP 1 445 133 B1 discloses an element of comb-like design through which a warm airflow flows from bottom to top in U-shaped grooves, whilst a cold airflow flows through the element at a 90° angle to the warm airflow through openings which are located between the U-shaped grooves. At the point where the two airflows meet, therefore, an air mixture consisting of warm and cold air is produced.

DE 198 26 990 B4 discloses a device consisting of two frames which are arranged substantially at a 90° angle to one another. Both frames have air guidance elements in the region enclosed thereby, which form channels inside the frame, through which air is able to flow. In this case, a cold airflow flows through one of the frames and a warm airflow flows through the other frame. As a result, the cold air and the warm air are mixed after flowing through the device.

It is a particular drawback in the prior art that, by means of the flow guidance elements, cross sections in the cold air paths and warm air paths are occasionally partially blocked, and/or the cold airflows and warm airflows are subjected to considerable deflections. Both influences also have a negative effect on the acoustics and the quantity of air.

DESCRIPTION OF THE INVENTION, OBJECT, SOLUTION, ADVANTAGES

It is, therefore, the object of the present invention to provide an air conditioning system which permits the cold airflow and the warm airflow to be mixed in an advantageous manner, in order to produce the temperature stratification required to fulfill passenger requirements, without significantly reducing the flow cross sections or subjecting the airflows to large deflections. Moreover, the design of the air conditioning system is intended to be simple and cost-effective to produce.

The object of the present invention is achieved by an air conditioning system having the features according to claim 1.

An exemplary embodiment of the invention relates to an air conditioning system, in particular for use in a motor vehicle, having a first flow channel for a first airflow which may be influenced thermally, having a second flow channel for a second airflow which may be influenced thermally, wherein the first flow channel extends relative to the second flow channel at a predeterminable angle, and having an air guidance element, wherein the air guidance element is arranged on or adjacent to at least one internal wall of the first flow channel or the second flow channel, wherein the air guidance element in section has a substantially convex shape in the direction of the first or second flow channel, and protrudes into the first or second flow channel, wherein the air guidance element has at least one finger which protrudes at a predeterminable angle into the first flow channel or the second flow channel.

This is advantageous as, consequently, the airflow is already able to be influenced in the flow channel such that the warm and cold air are able to be advantageously mixed inside the mixing region of the air conditioning system. In this case, however, there is no sudden deflection or marked reduction of the throughflow cross section.

By means of a finger, the airflow which flows through the flow channel in which the air guidance element is arranged may be specifically diverted so that a space is created, in particular immediately after the finger, which is not directly subjected to said airflow. The airflow of the respective other flow channel is advantageously able to flow in this space, whereby the mixing of the airflows is also improved.

In further advantageous embodiments, a plurality of fingers, in particular two or three fingers, may also be arranged on the air guidance element. As a result, a plurality of spaces may be advantageously produced in which the two airflows are able to be mixed together advantageously.

It is also preferable if the first airflow which is able to be influenced thermally is cold air and the second airflow which is able to be influenced thermally is warm air.

It is also advantageous if the air guidance element inside the first or second flow channel is arranged immediately adjacent to the interface of the first flow channel and the second flow channel.

By the arrangement immediately in the vicinity of the interface of the two flow channels, it is achieved that the airflow of the flow channel in which the air guidance element is arranged is directly influenced in the region where the two airflows are mixed together. As the influence of the airflow has the direct purpose of producing improved mixing, this is advantageous as a whole.

It is also to be preferred if the finger is arranged at the end region of the air guidance element facing the interface between the first flow channel and the second flow channel.

The arrangement of the finger at the end region of the air guidance element particularly favors the creation of spaces which one airflow is able to penetrate without being subjected to interference by the other airflow. Overall, therefore, the mixing of the two airflows is markedly improved.

It is also advantageous if the air guidance element has at least one first air guidance channel which guides at least parts of the air of the first flow channel or the second flow channel, in which the air guidance element is arranged, into the airflow of the respective other airflow.

By means of such an air guidance channel, moreover, the mixing of the two airflows may be advantageously influenced, as it is possible to introduce the airflow from the one flow channel in a targeted manner at a predetermined position into the airflow of the other flow channel.

It is also expedient if the air guidance element has a variable geometry along the width of the first flow channel or the second flow channel.

By means of a variable geometry of the air guidance element along the width, the airflow is able to be advantageously influenced at different points.

Thus, regions of different temperature may be produced over the width, i.e. in the extent of the y-direction of the mixing chamber. As specific outlets on the air conditioning system are generally preferably supplied from specific regions of the mixing chamber, different temperatures may be easily produced at different outlets and thus the desired stratification adjusted. This may be advantageously achieved for mixing the two airflows, depending on the specific design of the remaining air conditioning system.

It is also preferable if the angle between the first flow channel and the second flow channel has a value ranging from 45° to 135° degrees and preferably ranging from 70° to 110° degrees.

An angle within the above predetermined limit values is regarded as particularly advantageous for mixing the two airflows as, by means of such an angle, the two airflows merge with one another particularly advantageously and may be deflected from the mixing region into the outflow channels of the air conditioning system.

It is also expedient if a mixing chamber is arranged in the region of the interface of the airflow of the first flow channel and the airflow of the second flow channel.

The arrangement of the mixing chamber at the described point is particularly advantageous, therefore, as the air guidance element is consequently arranged in the immediate vicinity of the mixing chamber, whereby in particular the mixing of the airflows in the mixing chamber is improved.

It is also to be preferred if the direction and/or the speed of the first airflow or the second airflow which flows over the air guidance element is able to be influenced by means of the shape of the air guidance element such that a plurality of internal wall regions and/or a plurality of air regions at different temperatures may be produced in the mixing space.

In particular, by influencing the speed or the pulse of the airflows, it is possible in a simple manner to alter the direction and thus produce a specific mixing of the airflows. Additionally, elements which produce a high pressure loss may be dispensed with.

It is also advantageous if the air guidance element has at least one first air guidance channel and at least one second air guidance channel, wherein the at least first air guidance channel, viewed in the direction of flow of the air, is arranged at the left-hand end region of the air guidance element and the at least second air guidance channel is arranged at the right-hand end region of the air guidance element.

The arrangement of two air guidance channels is, in particular, advantageous with regard to mixing the two airflows. The one airflow, which flows through the flow channel in which the air guidance element is arranged, may be conducted via the air guidance channels in a specific manner into the other airflow. As a result, zones may be produced inside the mixing chamber which are mixed together differently and thus also at different temperatures. As the outflow channels of the air conditioning system are fed from the mixing chamber, said outflow channels may also be subjected in each case to airflows at different temperatures.

It is also expedient if the air guidance element is arranged in a first flow channel or a second flow channel through which cold air flows.

This is advantageous, in particular, as generally with air conditioning systems regulated on the air side, typically the pressure loss inside the flow channel for the cold air is considerably less than the pressure loss in the flow channel for the warm air. The pulse of the cold air is thus dominant in comparison with that of the warm air, whereby it is particularly advantageous to influence the flow of cold air via an air guidance element according to the invention.

It is also to be preferred if the air guidance element is configured integrally with the first flow channel or the second flow channel of the air conditioning system.

By means of a one-piece design, it is ensured that the air only flows around the air guidance element on the upper face thereof oriented into the flow channel. Also, in an advantageous embodiment the air guidance element may also be designed as an integral component of the flow channel itself, which enables it to be produced in an advantageous manner.

It is also advantageous if the air guidance element is able to move on or adjacent to an internal wall of the first flow channel or the second flow channel relative thereto in at least one direction of movement.

By a predetermined mobility of the air guidance element, it is possible to influence of the airflows inside the flow channels in a variable manner. This is advantageous, in particular, if the airflow is influenced due to externally predetermined dimensions. Thus, an adjustment of the air guidance element may be produced, for example, depending on the operating state of the air conditioning system and/or on the requirements of the driver.

Moreover, it is expedient if at least one movement of the air guidance element is able to be controlled and/or regulated.

By a movement of the air guidance element which is able to be controlled and/or regulated, the air guidance element is able to be influenced depending on external control parameters. Thus, the air guidance element may be influenced, for example, according to the operating state. The overall efficiency of the air conditioning system may be improved by such control and/or regulation.

Advantageous developments of the present invention are disclosed in the following description of the figures and in the sub-claims.

BRIEF DESCRIPTION OF THE DRAWINGS

The invention is described in detail hereinafter by means of an exemplary embodiment with reference to the drawings, in which.

PREFERRED EMBODIMENT OF THE INVENTION

Figure 1:
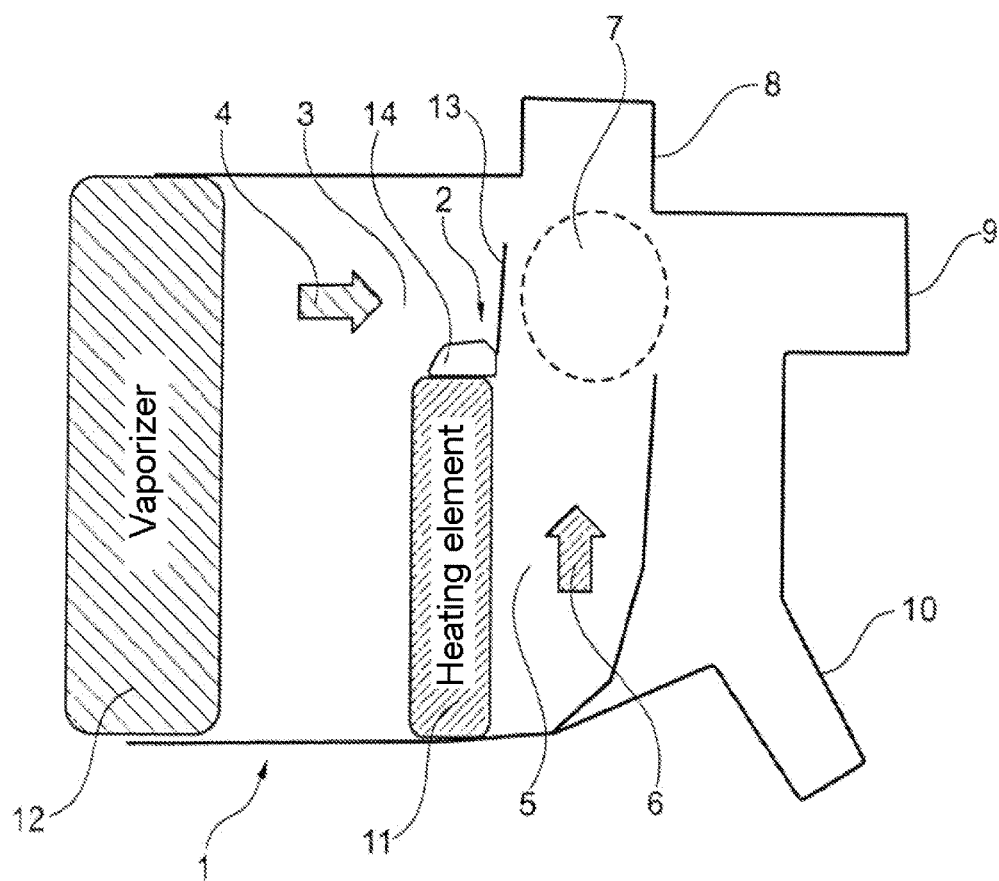
FIG. 1 shows a schematic view of an air conditioning system, in particular the region arranged downstream of the vaporizer.

FIG. 1 shows a section through an air conditioning system 1. In this case, the air conditioning system 1 is shown in section. The air conditioning system 1 is shown in the illustration shown in FIG. 1, in particular in the region thereof which is arranged downstream of the vaporizer 12.

In current air conditioning systems 1 which are used for applications in motor vehicles, the airflow is subdivided after flowing through the vaporizer 12 into a region for cold air as well as a region for warm air. In the example shown in FIG. 1, a portion of the air which flows through the vaporizer 12 subsequently flows through the heating element 11. The quantity of air which has flowed through the heating element 11 then flows in the flow channel 5 as warm air 6 through the air conditioning system 1. The portion of air which does not flow through the heating element 11 after flowing through the vaporizer 12 flows in the flow channel 3 as cold air 4. In alternative embodiments, the reverse case may also be envisaged.

In order to achieve mixing between the cold air 4 and the warm air 6, the two airflows meet one another in a region of a mixing chamber 7. The air brought to temperature, i.e. for example air at a predeterminable temperature, is conducted out of the region of the mixing chamber 7 via the outlet openings 8, 9, 10 into the interior of the vehicle.

The exact design of the flow channels of the air conditioning system is at this point not essential to the invention and is therefore also not described in detail.

In alternative embodiments to FIG. 1, a different design of the flow channels may also be envisaged. A different arrangement of a mixing chamber or the outlet opening of the air conditioning system may also be envisaged. It is also conceivable in alternative embodiments that further housing elements are arranged between the vaporizer and the heating element, said housing elements additionally directing the airflow in a predetermined direction. Also, a different arrangement of the vaporizer and/or the heating element is conceivable. Different arrangements from the vertical arrangement of the vaporizer and the heating element shown in FIG. 1 are also conceivable.

An air guidance element 2 is arranged in the flow channel 3 which contains the cold air 4. Said air guidance element 2 is positioned in FIG. 1 so that it is arranged immediately adjacent to the interface of the flow channel 3 and the flow channel 5.

Thus the air guidance element 2 is also arranged immediately upstream of the mixing chamber 7 in which the cold air 4 is mixed with the warm air 6. The purpose of the air guidance element 2, the more precise construction thereof being described in detail in the following illustrations, serves to improve the mixing of cold air 4 and/or warm air 6.

In alternative embodiments of an air conditioning system, it is possible to envisage arranging the air guidance element 2 in the flow channel 5 for the warm air 6. It is, however, advantageously arranged in the flow channel 3 for the cold air 4, as generally the pulse of cold air 4 is greater than that of the warm air 6. This is associated with the different pressure drops present inside the channels 3, 5 of the air conditioning system 1.

In a further alternative embodiment, an arrangement of one or more air guidance elements in each case in the warm air channel and in the cold air channel of the air conditioning system may also be envisaged.

By specifically influencing the greater airflow pulse, it is possible to achieve more thorough mixing and thus improved mixing of the warm air and the cold air.

The air guidance element 2 substantially consists of a basic body 14 which, as in FIG. 1, has an at least partially convex cross section. Moreover, the air guidance element 2 has a finger 13 which protrudes into the airflow of the cold air 4 at a predeterminable angle.

The air guidance element 2 is arranged directly on one of the internal walls of the flow channel 3. Preferably, the air guidance element 2 in this case is integrally connected to the internal wall of one of the flow channels.

In alternative embodiments, it is conceivable that the air guidance element 2 is arranged on a different inner surface of the flow channel 3. It is also conceivable that the air guidance element 2 is arranged in the flow channel 5 which conducts the warm air 6.

Figure 2:
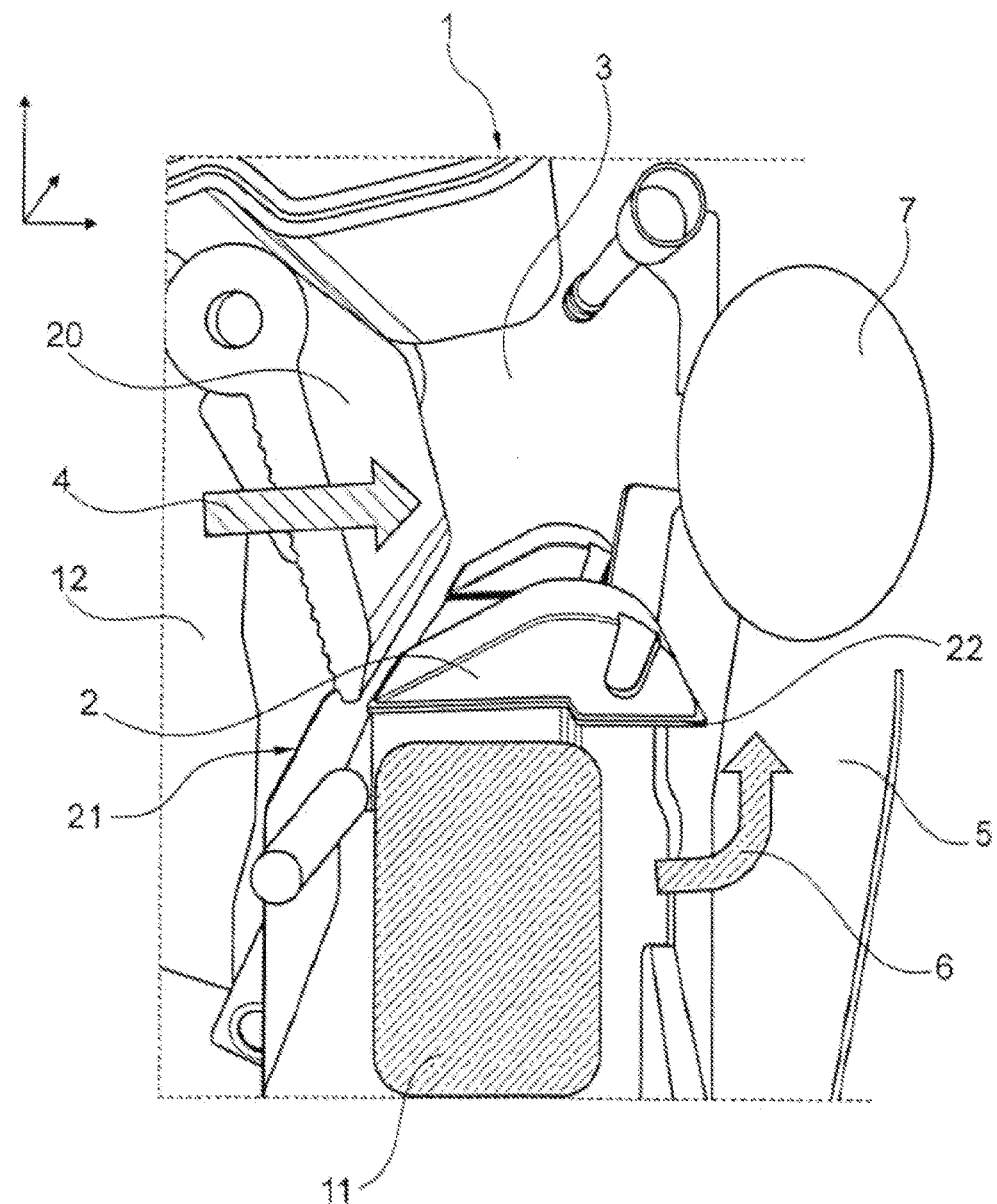
FIG. 2 shows a view of a section through an air conditioning system in a view similar to FIG. 1.

FIG. 2 shows a view of an air conditioning system 1. To this end, the air conditioning system 1 is shown in a construction shown in similar section to that in FIG. 1. In addition to the construction already shown in FIG. 1, the cold air flap 20 may be identified here, said cold air flap regulating the quantity of the airflow which flows through the flow channel 3. Moreover, the warm air flap 21 arranged thereunder may be identified, said warm air flap regulating the quantity of the airflow which subsequently flows through the heating element 11.

It may be clearly seen that the air guidance element 2 is directly connected to one of the internal walls 22 of the flow channel 3. The design of the air guidance element 2 as a separate component which is able to be freely fixed inside the flow channel 3, 5 is also possible.

As may be identified in FIG. 2, the air guidance element in the embodiment shown in FIG. 2 substantially consists of a basic body 14 which in each case has higher raised portions along the width of the flow channel 3 on its outer regions than in the central region. It may be clearly seen here that the cross section of the air guidance element along the width of the flow channel 3 is variable.

The exact design of the basic body 14 of the air guidance element 2 in this case is substantially dependent on the remaining geometry of the flow channel in which the air guidance element 2 is arranged. Also, the average airflow speed as well as the quantity of air flowing through in the flow channel, in which the air guidance element 2 is arranged, has an influence on how the path of the cross section of the basic body 14 along the width of the flow channel looks in detail. Moreover, the exact number and the respective position of the air outlets 8, 9, 10 has an influence on the design of the basic body 14 and/or the air guidance element 2.

In principle, in section the basic body 14 forms at least partially a profile with a flat, slightly rising path, viewed in the direction of flow of the cold air 4, which terminates in a considerably thicker convex end. For optimizing the flow, the basic body 14 may also have further contours.

In principle, it is advantageous to select a shape for the basic body 14 which permits the air flowing past to flow over the air guidance element without the occurrence of flow separations and to ensure an airflow which is as optimal as possible.

Figure 3:
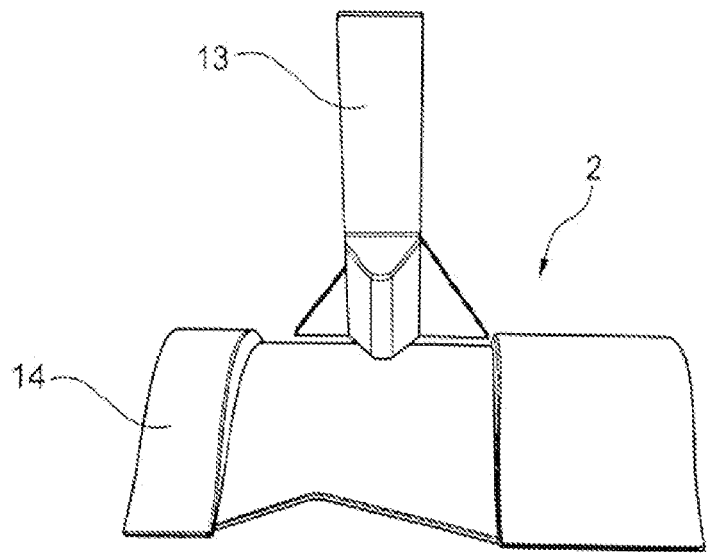
FIG. 3 shows a view of an air guidance element according to the invention viewed in the direction of flow.

FIG. 3 shows an embodiment according to the invention of the air guidance element 2 consisting of a basic body 14 which is substantially convex in cross section, with a variable cross section along the width of the flow channel in which the air guidance element 2 is subsequently arranged.

Additionally, the air guidance element 2 comprises the finger 13 which, viewed in the direction of flow, is arranged in the end region of the air guidance element 2 and protrudes at a predeterminable angle into the airflow which flows over the air guidance element 2.

The finger 13 is advantageously designed integrally with the basic body 14. In order to produce a flow resistance which is as low as possible, it is advantageous if it has an aerodynamically favorable shape on the side subjected to flow. In the exemplary embodiment shown in FIGS. 3 and 4, the finger 13 has in its bottom region a triangular cross section which at the top merges with a thin plate-like cross section.

FIG. 3 shows an illustration of the air guidance element with views in the direction of the flowing air which flows over the air guidance element 2.

Figure 4:
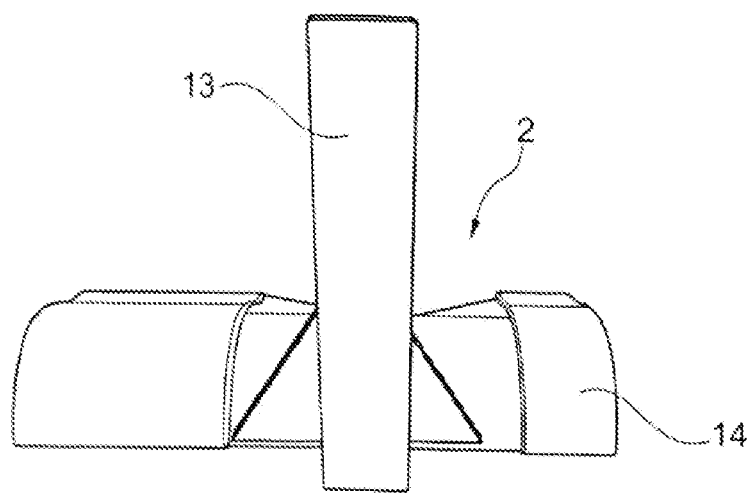
FIG. 4 shows a view of an air guidance element according to the invention viewed counter to the direction of flow.

FIG. 4 shows the same air guidance element 2 as already shown in FIG. 3 but in this case in the opposing direction to the view in the direction of flow of the medium which flows around the air guidance element 2 in the installed state.

Deviating from the embodiments of the air guidance element 2 shown in the figures, with only one finger 13, it is also perfectly conceivable to arrange a plurality of fingers, in particular 2 or 3 fingers 13 on the air guidance element 2. The exact number of fingers 13 as well as the arrangement of the fingers 13 on the air guidance element 2 and/or the basic body 14 of the air guidance element 2 are dependent on the remaining structural design of the air conditioning system 1 and thus the required influence of the flow in the flow channel 3, 5.

In particular, the geometric design of the mixing chamber 7, in which the warm air 6 as well as the cold air 4 are mixed together, has an effect on the positioning and configuration of the single or multiple fingers 13. Depending on the air mixing to be achieved, the fingers 13 are advantageously arranged on the air guidance element 2 in the flow channel 3, 5.

The main task of the finger 13 is to provide a region which is not able to be directly occupied by the airflow which flows over the air guidance element 2. Thus, the finger 13 enables the respective other airflow to rise up in the slipstream thereof, protected from the flow of the medium which flows over the air guidance element, and thus to achieve improved mixing of the two airflows.

In order to produce this region for lifting the second airflow, it is desirable for the finger 13 to be arranged as closely as possible to the edge intersecting the flow channel 3 which guides the cold air 4 and the flow channel 5 which guides the warm air 6. This is also to be preferred for the arrangement of the air guidance element 2 itself.

Figure 5:
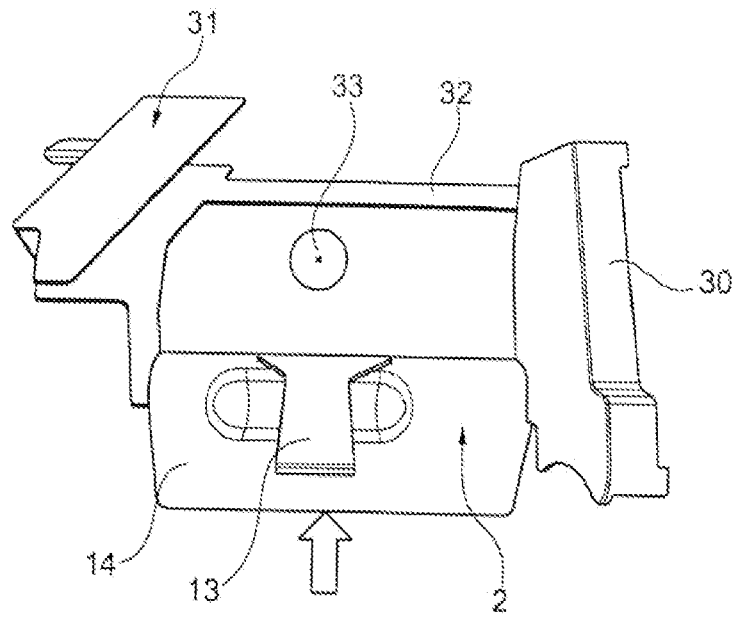
FIG. 5 shows a view of the air guidance element according to the invention with the air guidance channels arranged to the side.

FIG. 5 shows a view of a further air guidance element 2 according to the invention. The basic body 14 as well as the finger 13 substantially coincide in construction and arrangement with the embodiments shown in FIG. 3 and FIG. 4.

In addition to the embodiment 3 and/or FIG. 4, the air guidance element 2 of FIG. 5 has only laterally arranged air guidance channels 30, 31. The air guidance channels 30, 31 are arranged in the subsequently installed state such that the air guidance channels 30, 31 bear against opposing side walls of the flow channel 3, 5.

The air guidance element 2 forms, in addition to its basic body 14 and the air guidance channels 30 and 31, a frame 32 which encompasses the second flow channel. The direction of airflow of the second airflow, the warm airflow in the case of the air conditioning system 1 forming the basis of the invention, is shown through the point 33 in the center of said frame 32.

The purpose of the air guidance channels 30, 31 is to conduct the air flowing over the air guidance element 2 to the second airflow which flows upwards at an angle of ca. 90° to the direction of the flow of air of the first airflow from bottom to top through the air guidance element 2. In this manner, improved mixing of the two air flows may be achieved.

The air guidance channels 30, 31 are optional and are only used when additional air guidance elements are required on the air guidance element 2 in order to reach sufficient mixing of the two airflows. Amongst other things, the air flowing over the air guidance element 2 may be conducted around the air flowing in from below by means of the air guidance channels 30, 31.

Figure 6:
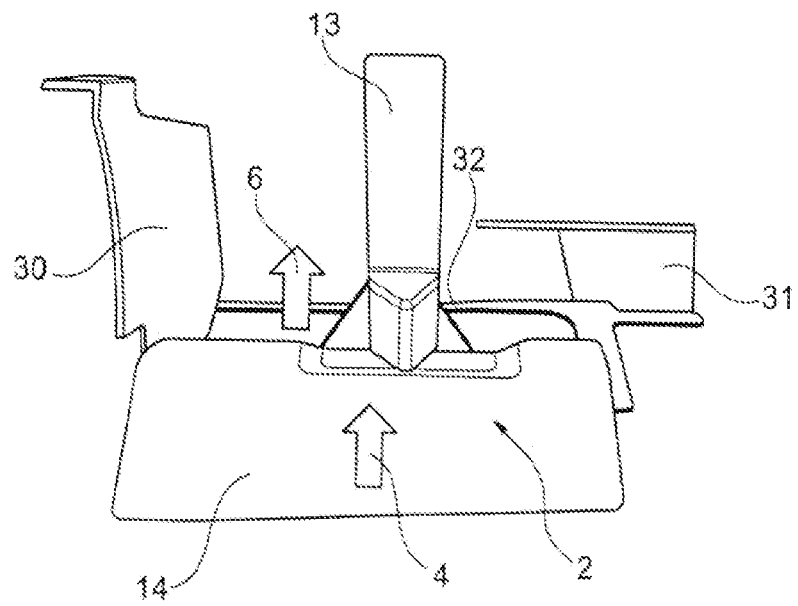
FIG. 6 shows a view of the air guidance element according to the invention with the air guidance channels arranged to the side, viewed in the direction of flow.

FIG. 6 shows the air guidance element 2 already shown in FIG. 5, but now in a view in the direction of the flow of air which flows over the air guidance element 2. Air which in the case described in FIGS. 1 to 7 corresponds to the cold air 4 is indicated by means of the arrow 4, and air shown by the arrow 6 is the warm air 6 which in this case flows from below through the frame 32 of the air guidance element 2.

By viewing FIG. 5 and FIG. 6 together, it may be seen how the warm air 6 flows from bottom to top through the air guidance element, whilst the cold air 4 flows over the air guidance element 2 and flows into the airflow of the warm air 6 around the finger 13. The laterally arranged air guidance channels 30 and 31 are arranged so that components of the cold air 4 are conducted past the warm air 6 in order to achieve improved mixing thereby.

The finger 13 in this case provides the warm airflow, which rises from bottom to top, with a slipstream which makes it possible for the warm air 6 to be able to rise therein undisturbed by the airflow of the cold air 4.

Figure 7:
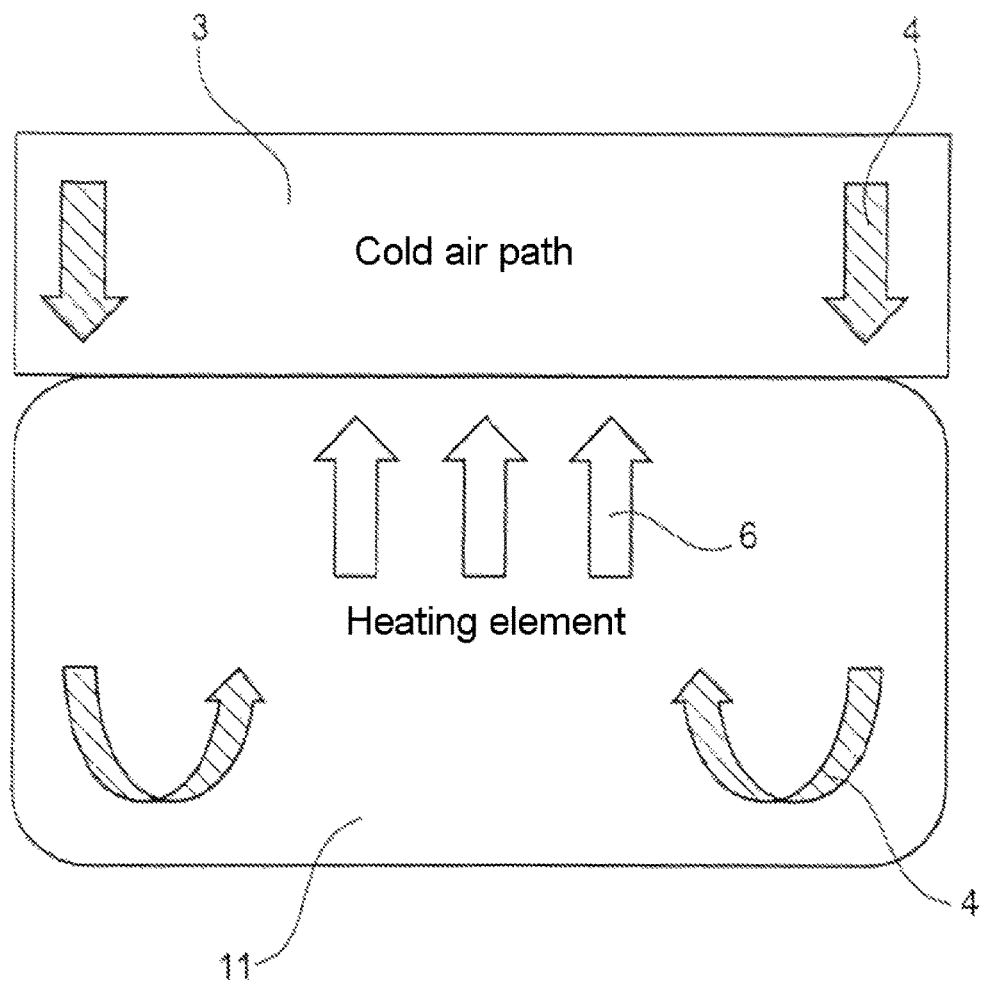
FIG. 7 shows a basic sketch which shows the mixing of the warm airflow and the cold airflow.

FIG. 7 shows a schematic drawing, with a view counter to the direction of flow of the cold air 4 in the flow channel 3.

The air guidance element 2 is not shown for reasons of clarity.

A heating element 11 is shown in the lower region, as has already been shown in the previous figures. The warm air 6 flows out of the plane of the illustration in which the heating element 11 is located toward the observer and, due to the housing parts which form the flow channel 5, upwards in the direction of the flow channel 3.

Cold air 4 flows out of the flow channel 3, likewise out of the plane of the illustration toward the observer, and is conducted at that point to the left and right in the external regions of the flow channel 3 via, for example, the use of air guidance elements 30, 31, laterally past the airflow of the warm air 6 and subsequently mixed with the warm air 6.

The exact design of the air guidance element 2 as well as the air guidance elements 30, 31 and the finger 13 is always dependent on the ultimate application. More specifically, it is dependent on the arrangement of the outlet nozzles 8, 9, 10 inside the air conditioning system 1 as well as the geometric design of the mixing chamber 7.

The invention claimed is:

1. An air conditioning system comprising:
   a first flow channel for a first airflow;
   a second flow channel for a second airflow, wherein the first flow channel extends relative to the second flow channel at a predeterminable angle, wherein the first airflow and second airflow are mixed in the air conditioning system; and
   an air guidance element, wherein the air guidance element is arranged on at least one internal wall of the first flow channel or the second flow channel, wherein the air guidance element comprises a body, wherein in a direction of an airflow over the body, the air guidance element has a front region arranged upstream, an end region arranged downstream, and a middle region arranged between the front and end regions, wherein in a direction perpendicular to the airflow over the body, the body has two outer regions and a central region arranged between the two outer regions, wherein the body has a substantially curved convex shape in the direction of the airflow and protrudes into the first or second flow channel such that the air guidance element is relatively thinner in the front and end regions as compared to the middle region, wherein the air guidance element has at least one finger attached to and arranged on the end region of the body of the air guidance element and extending from said end region at a predeterminable angle into the first flow channel or the second flow channel, wherein the finger projects in a direction further downstream of the end region, wherein the end region abuts an interface between the first and second flow channel,
   wherein the body has raised portions relative to the internal wall of the first or second flow channel on the two outer regions of the body as compared to the central region of the body such that a channel is formed in the central region between the two outer regions extending from the front region to the end region, wherein the finger is integrally arranged on a portion of the end region that intersects the central region, wherein the finger has in its bottom region a triangular cross-section and in its top a thin plate like cross section such that a mixing chamber is created immediately after the finger.

2. The air conditioning system according to claim 1, wherein the first airflow is cold air and the second airflow is warm air.

3. The air conditioning system according to claim 1, wherein the air guidance element inside the first flow channel or the second flow channel is arranged immediately adjacent to the interface of the first flow channel and the second flow channel.

4. The air conditioning system according to claim 1, wherein the finger is arranged at the end region of the air guidance element facing the interface between the first flow channel and the second flow channel.

5. The air conditioning system according to claim 1, wherein the air guidance element has at least one first air guidance channel which guides at least parts of the air of the first flow channel or the second flow channel, in which the air guidance element is arranged, into the airflow of the respective other airflow.

6. The air conditioning system according to claim 1, wherein the air guidance element has a variable geometry along the width of the first flow channel or the second flow channel.

7. The air conditioning system according to claim 1, wherein the angle between the first flow channel and the second flow channel has a value ranging from 45° to 135° degrees.

8. The air conditioning system according to claim 7, wherein the angle between the first flow channel and the second flow channel has a value ranging from 70° to 110° degrees.

9. The air conditioning system according to claim 1, wherein a mixing chamber is arranged in the region of the interface of the airflow of the first flow channel and the airflow of the second flow channel.

10. The air conditioning system according to claim 9, wherein the direction or the speed of the first airflow or the second airflow is influenced by the air guidance element such that a plurality of internal wall regions or a plurality of air regions at different temperatures may be produced in the mixing chamber.

11. The air conditioning system according to claim 1, wherein the air guidance element has at least one first air guidance channel and at least one second air guidance channel, wherein the at least first air guidance channel, viewed in the direction of the flow of the air, is arranged at the left-hand end region of the air guidance element and the at least second air guidance channel is arranged at the right-hand end region of the air guidance element.

12. The air conditioning system according to claim 1, wherein the air guidance element is arranged in a first flow channel or a second flow channel through which cold air flows.

13. The air conditioning system according to claim 1, wherein the air guidance element is configured integrally with the first flow channel or the second flow channel of the air conditioning system.

14. An air guidance element for an air conditioning system according to claim 1, wherein the air guidance element is able to move on or adjacent to an internal wall of the first flow channel or the second flow channel relative thereto in at least one direction of movement.

15. The air guidance element according to claim 14, wherein at least one movement of the air guidance element is able to be controlled or regulated.

16. The air conditioning system according to claim 1, wherein a bottom region of the at least one finger comprises a triangular cross section that merges with a top region comprising a plate cross section.

17. An air conditioning system comprising:
   a first flow channel for a first airflow;
   a second flow channel for a second airflow, wherein the first flow channel extends relative to the second flow channel at a predeterminable angle, wherein the first airflow and second airflow are mixed in the air conditioning system; and
   an air guidance element, wherein the air guidance element is arranged on at least one internal wall of the first flow channel or the second flow channel, wherein the air guidance element comprises a body, wherein in a direction of an airflow over the body, the air guidance element has a front region arranged upstream, an end region arranged downstream, and a middle region arranged between the front and end regions, wherein in a direction perpendicular to the airflow over the body, the body has two outer regions and a central region arranged between the two outer regions, wherein the body has a substantially curved convex shape in the direction of the airflow and protrudes into the first or second flow channel such that the air guidance element is relatively thinner in the front and end regions as compared to the middle region, wherein the air guidance element has at least one finger attached to and arranged on the end region of the body of the air guidance element and extending from said end region at a predeterminable angle into the first flow channel or the second flow channel, wherein the finger projects in a direction further downstream of the end region, wherein the end region abuts an interface between the first and second flow channel, wherein the body has raised portions relative to the internal wall of the first or second flow channel on the two outer regions of the body as compared to the central region of the body such that a channel is formed in the central region between the two outer regions extending from the front region to the end region, wherein the finger is arranged on a portion of the end region that intersects the central region, wherein a bottom region of the at least one finger comprises a triangular cross section that merges with a top region comprising a plate cross section such that a mixing chamber is created immediately after the finger.

\* \* \* \* \*